US006773765B1

(12) United States Patent
Gambino et al.

(10) Patent No.: US 6,773,765 B1
(45) Date of Patent: Aug. 10, 2004

(54) THERMALLY SPRAYED, FLEXIBLE MAGNET WITH AN INDUCED ANISOTROPY

(75) Inventors: Richard J. Gambino, Stony Brook, NY (US); Dongil Shin, Seoul (KR); Jeffrey A. Brogan, Stony Brook, NY (US)

(73) Assignee: The Research Foundation of State University of New York, New York, NY (US)

( * ) Notice: Subject to any disclaimer, the term of this patent is extended or adjusted under 35 U.S.C. 154(b) by 0 days.

(21) Appl. No.: 09/433,858

(22) Filed: Nov. 4, 1999

(51) Int. Cl.[7] .............................................. B29C 35/08

(52) U.S. Cl. ....................... 427/599; 427/128; 427/129; 427/130; 427/131; 427/132; 427/189; 427/190; 427/191; 427/195; 427/196; 427/201; 427/422; 427/426; 427/427; 427/447; 427/453; 427/455; 427/456; 427/547; 427/548; 427/550; 427/598

(58) Field of Search ................................ 427/128, 132, 427/131, 130, 129, 548, 599, 426, 427, 422, 447, 453, 455, 456, 189, 190, 195, 196, 201, 547, 550, 598

(56) References Cited

U.S. PATENT DOCUMENTS

| | | | |
|---|---|---|---|
| 3,861,955 | A | 1/1975 | Lemelson |
| 3,985,588 | A | 10/1976 | Lyman |
| 5,272,008 | A | 12/1993 | Shain et al. |
| 6,217,252 | B1 | 4/2001 | Tolliver et al. |
| 6,468,678 | B1 | 10/2002 | Dahlin et al. |

*Primary Examiner*—Bernard Pianalto
(74) *Attorney, Agent, or Firm*—Baker Botts L.L.P.

(57) ABSTRACT

Disclosed is a process for making a flexible magnet with an induced anisotropy, and in particular to a process for making a flexible anisotropic magnet by thermal spraying in the presence of an applied magnetic field. The method may be used to fabricate a substrate having a flexible anisotropic magnetic coating or a free standing anisotropic flexible magnet.

12 Claims, 12 Drawing Sheets

THERMALLY SPRAYED, FLEXIBLE MAGNET WITH AN INDUCED ANISOTROPY

TECHNICAL FIELD OF THE INVENTION

The present invention generally relates to flexible magnets with an induced ANISOTROPY, and in particular to flexible anisotropic magnets made by thermal spraying.

BACKGROUND OF THE INVENTION

Flexible magnets are used widely in electromechanical devices, e.g., generators, relays, motors, and magnetos; electronic applications, e.g., loudspeakers, travel-wave tubes, and telephone ringers and receivers; antitheft tags; holding devices, such as door closers, seals, and latches; and magnetic recording devices. Flexible magnets have been widely used in many applications because of desirable properties, such as good plasticity or resiliency and superior workability. These desirable properties are not found in hard magnets, such as sintered ferrite magnets or alloy magnets. However, the magnetic properties of such magnets have not been satisfactory because they are generally produced by blending a pulverized magnetic material with a rubber or plastic matrix. For example, prior art flexible magnets generally do not have a high enough energy product, i.e., the product of the coercivity and the remnant magnetization, which necessitates the use of larger magnets than that of the conventional sintered magnet for the same application. Accordingly, applications for flexible magnets have been restricted.

Furthermore, prior art flexible magnets are typically made by mixing substantially domain-size particles of a hexaferrite with a flexible binder and then shaping the mixture, typically by extrusion. The resulting free standing flexible magnets are limited in shape or form to long strips that must be cut down to size for practical use. In addition, flexible magnets produced from such processes can only be attached to a surface/substrate by undergoing another production step of using an additional fixing agent, such as an adhesive. Lastly, prior art flexible magnets are produced by using volatile organic compounds (VOC's) as the solvent. The use of such VOC's are environmentally hazardous, and the presence of VOC's is not desirable during the production process or in the final product.

The critical factors for improving magnetic properties of flexible magnets are as follows: (1) maximizing the magnetic particulate content in the matrix material; (2) maximizing the orientation of the magnetic particles in the matrix material in a desired direction; and (3) maximizing the energy product, i.e., the product of the coercivity and the remnant magnitization.

Accordingly, there exists a need in the art for a cost-effective method for efficiently making a flexible magnet having (i) an induced magnetocrystalline anisotropy, and (ii) complex geometric shapes which cannot be achieved by an extrusion process. There also exists a need for an efficient method to provide a substrate with a flexible anistropic magnetic coating without the need for adhesives. Finally, there also exists a need for a substantially VOC free process for making flexible magnets.

SUMMARY OF THE INVENTION

The present invention encompasses a method for producing a flexible anisotropic magnetic coating onto a substrate.

The method includes the step of thermal spraying a first spray stream of composite particles, which include magnetic particles incorporated into or onto a matrix material. The thermal spraying step is conducted at a temperature that is above the glass transition or melting point temperature of the matrix material, and a magnetic field is applied across the substrate. In one embodiment, the method further includes at least one additional spray stream of a magneto-fluid mixture. The at least one additional spray stream is combined with the first spray stream to coat the substrate. These novel methods provide magnetically coated substrates which exhibit magnetocrystalline anisotropy.

In another embodiment, a flexible, free standing, complex three-dimensional anisotropic magnet is provided by substituting the substrate with a removable mold in the above-described method. These flexible anisotropic magnets have magnetic particles dispersed within a matrix material.

BRIEF DESCRIPTION OF THE DRAWINGS

Further objects and advantages of the present invention will be more fully appreciated from a reading of the detailed description when considered with the accompanying drawings wherein.

DETAILED DESCRIPTION OF THE INVENTION

Figure 1:
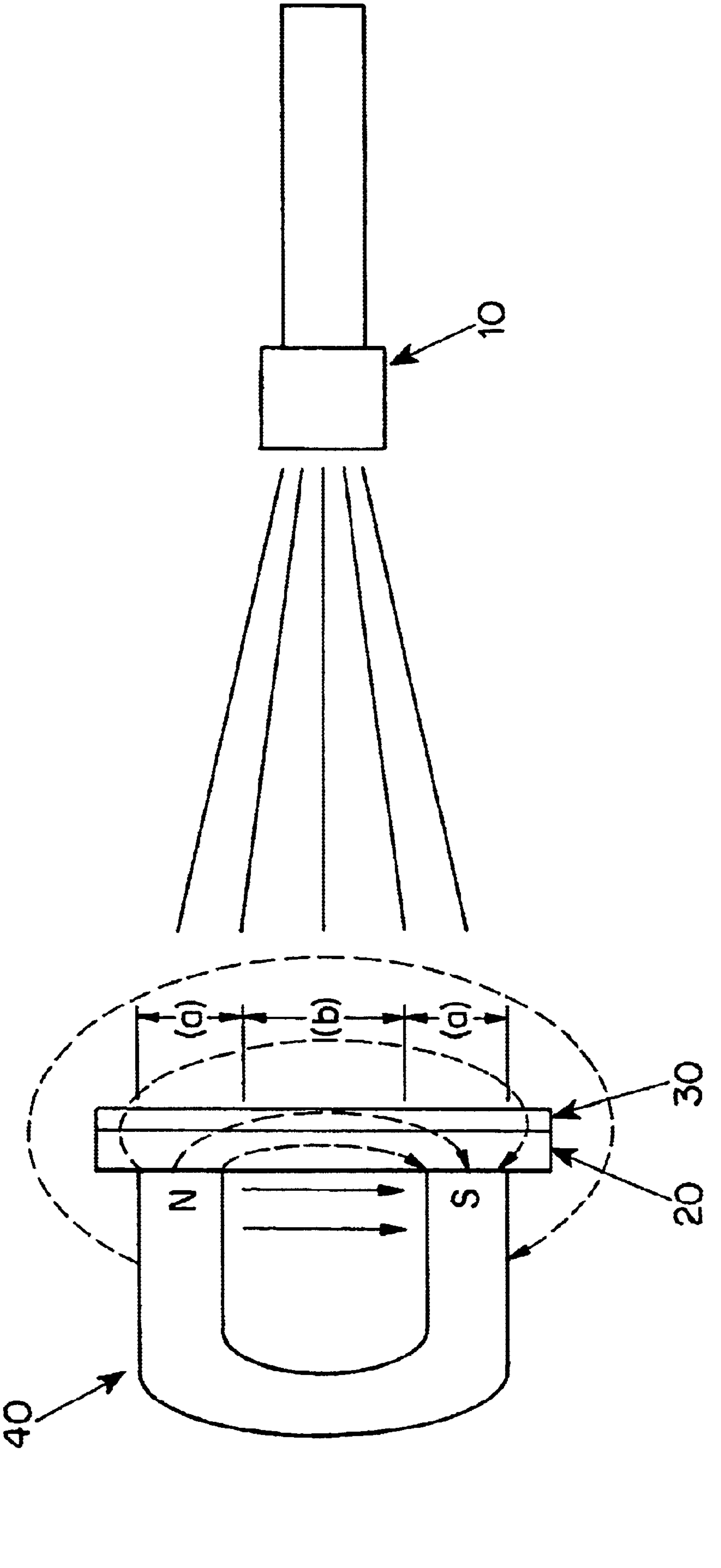
FIG. 1 illustrates a thermal spray arrangement according to the present invention.

The present invention provides a method for producing a flexible magnet having induced magnetocrystalline anisotropy energy. The flexible magnets according to the present invention have high energy products because (i) a high concentration of magnetic particles is incorporated into the matrix material and (ii) a high degree of orientation of the magnetic particles in the matrix material. High energy product, as used herein, means that the product of the coercivity and the remnant magnitization is greater than about 1.2 MG Oe, preferably greater than about 2.9 MG Oe, and most preferably greater than about 3.5 MG Oe. The term "about," as used herein means ±10% of the stated value.

The method of producing a flexible anisotropic magnet according to the present invention includes the step of thermal spraying a composite mixture, which includes composite particles of a matrix material and magnetic particles, onto a substrate at a temperature that is above the glass transition/melting point temperature of the matrix material but below the Curie temperature of the magnetic particles. The thermal spraying step is conducted while applying a magnetic field across the substrate. The present invention also provides an article of manufacture having magnetocrystalline anisotropic energy, which includes (i) a substrate, and (ii) a flexible anisotropic magnetic coating fixedly attached to the substrate. Since the present method does not require solvents, the flexible anisotropic magnets of the present invention are substantially free of volatile organic compounds (VOC's). Substantially free, as used herein, means that the flexible anisotropic magnets of the present invention have less than about 10%, preferably less than 5%, and most preferably less than 1% by weight of the referenced component. As a result, the flexible anisotropic magnets of the present invention and the process for making these magnets are environmentally friendly.

The present invention also provides a flexible anisotropic magnet having complex three-dimensional spray mold forms. In this embodiment, the substrate becomes a mold or work piece. Such substrate molds have a non-stick surface, typically including a fluoronated surface of a polymer, such as TEFLON. Complex three-dimensional spray mold forms, as used herein, means three-dimensional shapes which are created by using a mold, such as those used in manufacturing injection molded plastic products, to obtain any desired three-dimensional shape. These three-dimensional shapes cannot be obtained by using only an extrusion process, i.e., another process step would be required to obtain the desired shape.

Surprisingly, it has been found that the flexible magnets and flexible magnetic coatings produced according to the present invention have induced magnetocrystalline anisotropy, i.e., the ability to orient nearly all their important magnetic properties, such as remanence—$B_r$, coercivity—$H_c$, and maximum energy product—$(BH)_{max}$, in a particular direction. Furthermore, the method of producing flexible anisotropic magnets in accordance with this invention is (1) efficient because there is little or no loss of the magnetic particles and the matrix material, (2) cost effective because the steps are low in cost, and (3) environmentally friendly since no volatile organic compounds are needed.

The novel method of producing a flexible anisotropic magnetic coating according to the present invention can be practiced using the Thermal Spraying Apparatus illustrated in FIG. 1. A composite mixture is thermally sprayed by a commercially available thermal spray gun 10 onto a substrate 20 to form a flexible anisotropic magnetic coating 30 on top of the substrate while a permanent magnet 40 produces a magnetic field across the substrate. The thermal spray gun 10 can produce a minimum film thickness of about 100 microns. Commercially available thermal spray guns include model PFS400 available from Plastic Flamecoat Systems, located in Big Spring, Tex. The duration of the spray onto a particular region of the substrate can be increased to produce a desired thickness of the flexible anisotropic magnetic coating, i.e., a thickness to about 2 cm. Alternatively, a desired thickness can be obtained by repeating the thermal spraying step over a particular region.

During the spraying step, a permanent magnet 40, which is placed behind the substrate, produces a magnetic field across the substrate. Although in one embodiment the pole pieces are in contact with the substrate, it would be clear to one skilled in the art that the distance of the pole pieces to the substrate can be appropriately adjusted. In other words, the permanent magnet is positioned at an appropriate distance from the substrate so as to induce a magnetic field of sufficient strength to obtain the desired orientation of the magnetic particles during the thermal spray step. The substrate can be virtually any surface, e.g., solid, semi-solid, porous, or non-porous. The magnetic field is set to be strong enough to orient the magnetic particles in the heated matrix material layer before the matrix material solidifies on top of the substrate. The magnetic field of the permanent magnet is preferably in the range of about 9000 Oe to about 11,000 Oe at the pole piece. The magnetic field lines have a perpendicular or normal component to the coating surface at region a and a parallel component to the coating surface at region b. One of ordinary skill in the art would appreciate that more than one permanent magnet can be placed behind the substrate in various configurations to obtain numerous regions of parallel and normal magnetic field lines. It is believed that the individual magnetic particles that are thermally sprayed align themselves according to the magnetic field of the permanent magnet 40 placed behind the substrate 20 while the heated matrix material is in a fluid or semi-fluid state. This novel method produces a flexible anisotropic magnetic coating which becomes fixedly attached onto the substrate without the need for any additional adhesives.

In another embodiment, the substrate can be a removable mold or work piece on which or in which a free standing flexible magnet can be formed. In other words, the flexible magnet conforms to the shape of the mold. Such substrate molds have a non-stick surface, typically comprising a fluoronated surface of a polymer, such as TEFLON, and are well known to one skilled in the art of manufacturing molded plastic products. These substrate molds allow the flexible anistropic magnets of the present invention to be formed into any desired complex three-dimensional shape, such as solenoids, spheres, large cylinders, ellipses, or any other desired shape, without additional costly production steps, such as extrusion and cutting. The term "complex three-dimensional shape," as used herein means any three-dimensional form or shape which cannot be obtained using only an extrusion process.

The thermal spray gun 10 includes a heating means and a spraying means, which are not illustrated in FIG. 1. The heating means is typically a temperature controlled flame torch, which is positioned adjacent to the outlet of the spraying means. Alternatively, the heating means can heat a carrier gas which is used to heat the composite mixture carried by the gas. The spraying means typically includes a nozzle through which the composite mixture is pumped using a carrier gas, typically ambient air applied at positive pressure. When metallic magnetic particles are used, an inert carrier gas, such as nitrogen, is preferred. Typically, the heating means is set at a temperature that is higher than the melting point or glass transition temperature of the matrix material but lower than the Curie temperature of the magnetic particles. The inlet to the spraying means is fluidly connected to a pumping means (not illustrated) which combines a first feed line for a carrier gas, typically ambient air or an inert gas, with a second feed line which is connected to a reservoir (not illustrated) containing the composite mixture. Such a thermal spray gun apparatus has been used for thermal spraying of various polymers, as described in J. A. Brogan, "The coalescence of combustion-sprayed ethylene-methacrylic acid copolymer," *Journal of Materials Science*, Vol. 32(8) pp. 2099–2106 (1997), which is incorporated herein by reference.

Figure 2:
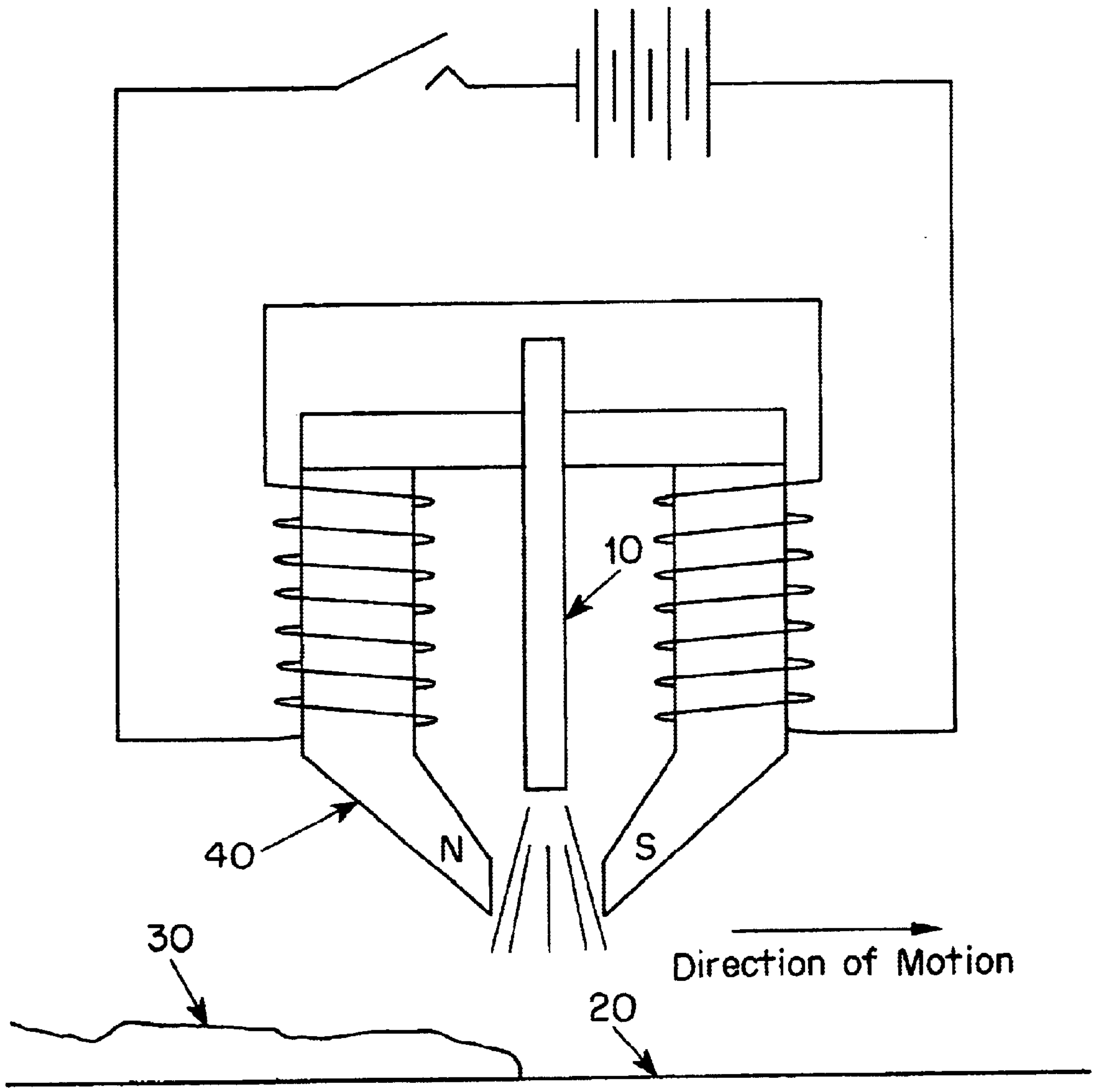
FIG. 2 illustrates an alternative thermal spraying arrangement according to the present invention.

Another embodiment of the thermal spray apparatus is illustrated in FIG. 2. In this embodiment, a permanent magnet or an electromagnet 40 is mounted with its pole faces positioned on opposing sides of the outlet of the thermal spray gun 10 above a horizontally moving substrate 20. The pole pieces of the magnet are positioned to produce a magnetic field having a parallel component to the substrate 20 and thereby orient the magnetic particles in the fluid/semi-fluid matrix material. The result is an anisotropic magnetic coating 30 that is fixedly attached to the substrate 20. Such a thermal spraying apparatus is useful when a magnet cannot be placed behind the substrate, e.g., when providing an anisotropic magnetic coating onto a road.

Figure 3A:
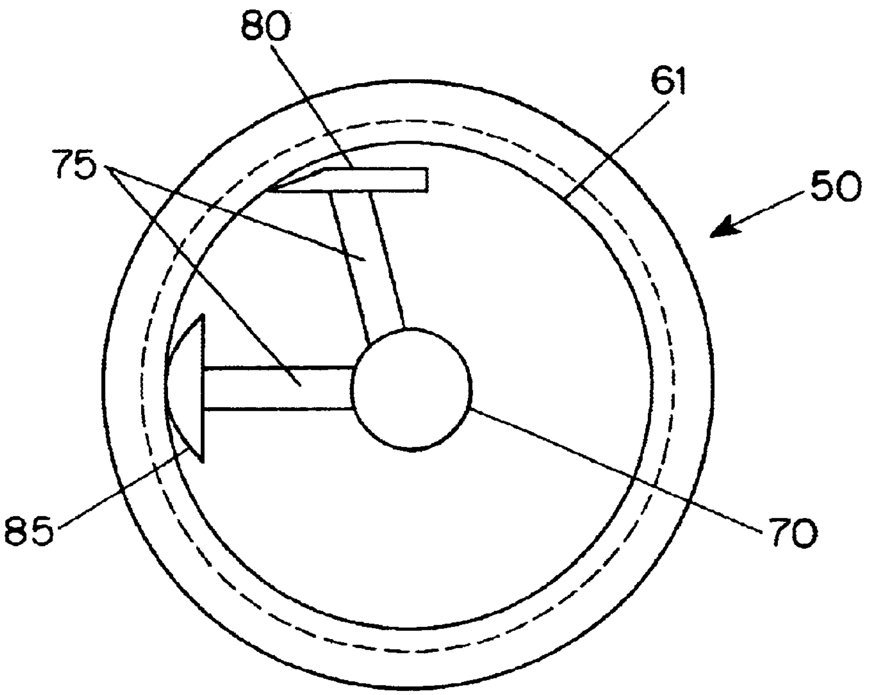
FIG. 3 illustrates a typical mechanofusion apparatus.
Figure 3B:
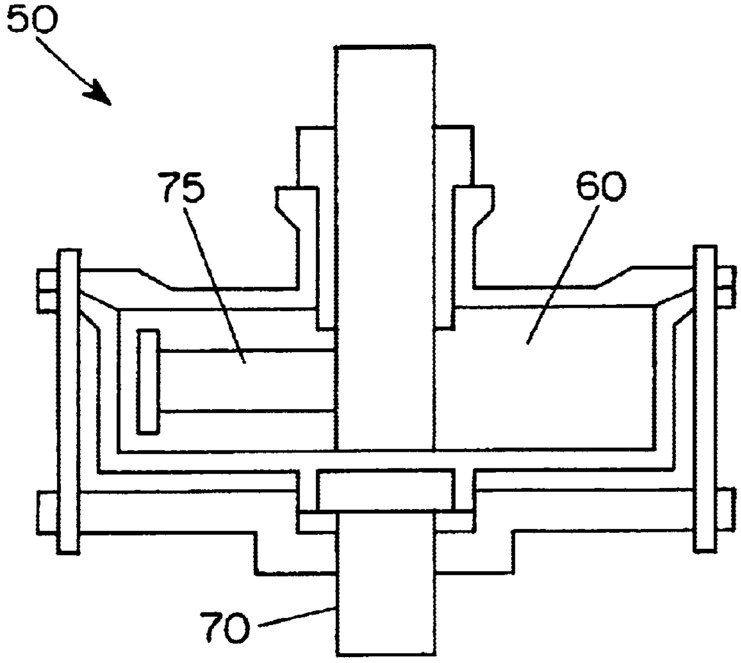

The reservoir (not shown) contains a composite mixture which includes composite particles of a matrix material and magnetic particles bound to the matrix material. Preferably, the composite mixture further includes matrix material particles which do not have magnetic particles bound thereto and/or therein. The composite particles of the magnetic particles and the matrix material have an average particle size from about 20 microns to about 200 microns. These composite particles are obtained by introducing the magnetic particles into the host matrix material particle by any method well known to one skilled in the art. Preferably, the magnetic particles are introduced into or onto the host matrix material particle using a process known in the art as mechanofusion, as described in Tohei Yokoyama, "The Angmill Mechanofusion System and Its Applications," *KONA*, No. 5 pp. 59–68 (1987), which is incorporated herein by reference. FIGS. 3(*a*) and 3(*b*) provide an illustration of a typical mechanofusion system. FIG. 3(*a*) provides a top view, and FIG. 3(*b*) provides a cross-sectional side view. The magnetic particles and the matrix material are added into the chamber 60 of the mechanofusion apparatus 50. A scrapper 80 and an inner piece 85 are separately attached to a rotating shaft 70 via arms 75. As the scrapper 80 and inner piece 85 are rotated against the chamber wall 61 within the chamber 60, the inner piece 85 subjects mechanical force to the mixture of magnetic particles and the matrix material to form a layer of composite particles. The layer of composite particles are than scrapped off of the chamber wall 61 by the scrapper 80. An example of a commercially available mechanofusion apparatus is model AF-15, available from Hosokawa Company, located in Summit, N.J.

Figure 4A:
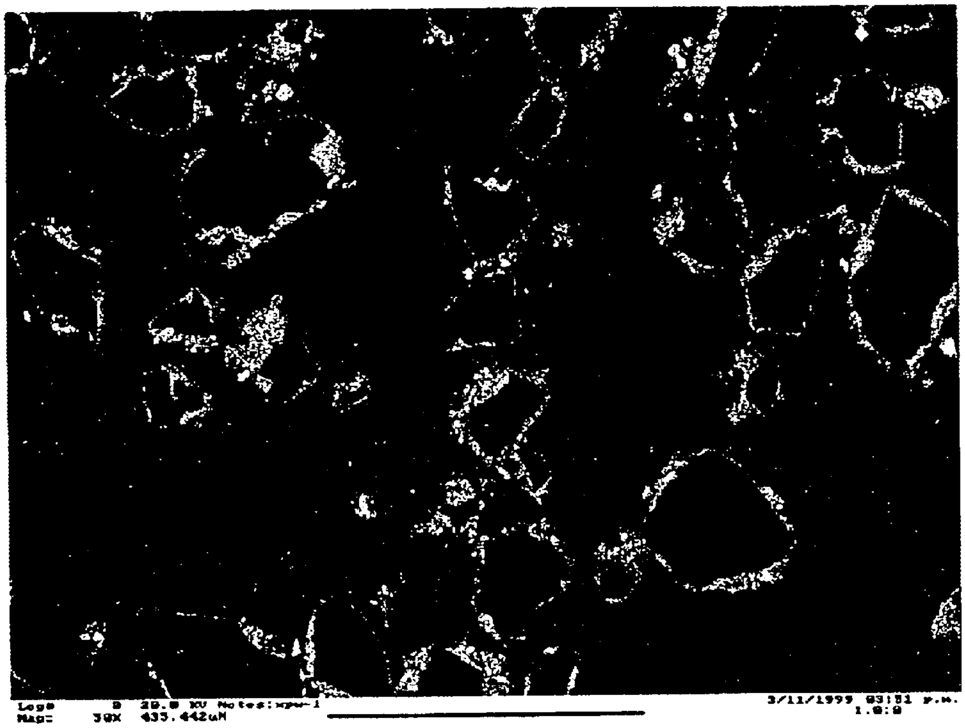
FIG. 4 shows SEM micrographs composite particles obtained from a mechanofusion milling process according to the present invention.
Figure 4B:

It is believed that the mechanofusion process helps to (i) disperse the magnetic particles by incorporation into or onto the matrix material particles so that the magnetic particles behave as single domains (i.e., agglomeration of the magnetic particles is prevented by minimizing exchange-coupling between individual magnetic particles), and (ii) produce a more spherical composite particle to enhance flow through the thermal spray gun assembly. FIGS. 4(*a*) and 4(*b*) provide scanning electron micrographs (SEM) of composite particles obtained from the mechanofusion process at 50× and 200×magnification, respectively. The micrographs show small magnetic particles (light areas) bound to the large matrix material particles (dark areas).

Magnetic particles that are useful according to the present invention are hard magnetic materials that are generally characterized by high coercivity ($H_c$), high remanent induction ($B_r$) and high maximum energy product ($(BH)_{max}$), as described in *Kirk-Othmer Encyclopedia of Chemical Technology*, 4th Ed., Vol. 15, pp. 723–788 (John Wiley & Sons, 1995), which is incorporated herein by reference. These magnetic particles have an $H_c$ greater than about 150 Oe, preferably greater than about 2,000 Oe, and are preferably in a single domain state. The magnetic particles have an average particle size from about 1 micron to about 10 microns, preferably from about 2 microns to about 5 microns. When the magnetic particles are metallic materials, it is preferable to use oxygen-free spraying conditions. For example, nitrogen gas may be used as the carrier gas for the thermal spray assembly.

Suitable magnetic particles that are useful according to the present invention include, but are not limited to, hard ferrites; rare-earth R—Co alloys; isotropic or anisotropic, high $H_c$, and columnar Alnicos; ternary R-based magnetic materials; chromium-cobalt-iron alloys; copper-nickel-iron and copper-nickel-cobalt alloys; platinum-cobalt alloys; manganesealuminum-carbon alloys; and mixtures thereof.

Hard ferrites that are useful according to the present invention are typically characterized by the general formula $MO.6Fe_2O_3$ where M is Ba or Sr. Examples of hard ferrites include, but are not limited to, $SrFe_{12}O_{19}$ ($T_c$=450° C.) and $BaFe_{12}O_{19}$ ($T_c$=450° C.).

Rare-earth R—Co alloys that are useful according to the present invention are typically characterized by the general formula $RCo_5$ where R is a rare-earth transition metal, preferably selected from the group consisting of Ce, Pr, Nd, and Sm. Examples of rare-earth R—Co alloys include, but are not limited to, $SmCo_5$ ($T_c$=730° C.), $CeCo_5$ ($T_c$=374° C.), $PrCo_5$ ($T_c$=612° C.), $NdCo_5$ ($T_c$=630° C.), $Sm(Co_{0.68}CU_{0.10}Fe_{0.21}Zr_{0.01})_{7.4}$ ($T_c$=800° C.), and $Sm_2Co_{17}$ ($T_c$=920° C.).

Ternary R-based magnetic materials that are useful according to the present invention include, but are not limited to, $Nd_2Fe_{14}B$ ($T_c$=312° C.), $Nd_2Fe_{14}C$ ($T_c$=262° C.), $Nd_2Fe_{14}N$ ($T_c$=312° C.), $Fe_3B$:Nd ($T_c$=512° C.), $SmFe_{11}Ti$ ($T_c$=312° C.), $SmFe_{10}V_2$ ($T_c$=337° C.), $SmFe_{10}Mo_2$ ($T_c$=187° C.), $Sm_2Fe_{17}C$ ($T_c$=267° C.), $Sm_2Fe_{17}N_{2.7}$ ($T_c$=477° C.), $Sm(Co,FeCu)_7$ ($T_c$=827° C.), and $Nd_2Co_{14}B$ ($T_c$=722° C.).

Cobalt ferrites are also useful as magnetic particles according to the present invention. Preferred are cobalt ferrites in which some of the cobalt and some of the iron is it substituted by other transition metal ions, provided that at least 50% of the divalent metal is cobalt. An example of useful cobalt ferrites include, but is not limited to, $CoFe_2O_4$ ($T_c$=520° C.).

Matrix materials that are useful according to the present invention are amorphous or crystalline polymers which have a sharp change in viscosity at its glass transition temperature or melting point, respectively, so that the matrix material can be converted to a fluid/semi-fluid state in a relatively short period of time, i.e., become fluid/semi-fluid during the time it is heated in the thermal spray assembly. In addition, the glass transition temperature/melting point must be lower than the Curie temperature of the magnetic particles. Those skilled in the art would appreciate that a conventional pre-heating processes can be used to enhance phase transitions over a short period of time. This phase transition from a solid to a fluid/semi-fluid is essential to allow the individual magnetic particles to be oriented according to the applied magnetic field while the matrix material is in the fluid/semi-fluid state, i.e., before the matrix material cools and solidifies. The matrix material, which is provided in particulate form, may have an average particle size from about 30 microns to about 250 microns, preferably from about 40 microns to about 180 microns. Typically, the matrix material particles are about 20–60 times larger on average than the magnetic particles.

Matrix materials useful according to the present invention include, but are not limited to, polyethylene; polyethylene-methacrylic acid copolymer (EMAA); polypropylene; polyvinylchloride; polyvinylacetate; nylon; ABS; polycarbonate; polystyrene; methacryl resin; polyacetal; polyamide resin; thermoplastic polyurethane; EVA resin; polysulfone (commercially available from Amoco and ICI); polyether sulfone (commercially available from Amoco and ICI); polyarylsulfone (commercially available from Amoco and ICI); polyetherimide; imide-based polymers (commercially available from General Electric and Hoechst-Celanese); polyphenylene oxide; fluoroplastics; acrylonitrile-styrene resin; ionomer resin; vinylchloride-vinylacetate copolymer; chlorosulfonated polyethylene (commercially available as HYPALON 450); polyisobutylene (commercially available as VISTANEX L-140); ketone-based polymers such as polyketone (commercially available as Kadel from Amoco), poly(etherketone) (commercially available as Hostatec from Hoechst, UltraPek from BASF, and VictrexPek from ICI); poly(etheretherketone) (commercially available as Victrex from ICI); poly(etherketoneketone) (commercially available as PEKK from Du Pont); poly(phenylene sulfide) (commercially available as Ryton from Phillips; Tedur from Bayer; Supec from General Electric; and Fortron from Hoechst); and mixtures thereof.

Matrix materials most useful according to the present invention include, but are not limited to, the low temperature plastics (LTP's) that exhibit low melt viscosities. LTP's include polyethylene (e.g., Alkathene™, commercially available from ICI, located in New York, N.Y.), polypropylene (e.g., Novolen™, commercially available from BASF, located in Clemson, South Carolina), polyester elastomers (e.g., Hytrel™, commercially available from Dupont Company, located in Wilmington, Del.) and polyethylene copolymers and ionomers. Polyethylene copolymers such as ethylene methacrylic acid copolymer (EMAA) is commercially available from Dupont Company as Nucrel™ and the ionomer based upon EMAA is also commercially available from Dupont Company as Surlyn™. Other polyethylene copolymers of interest include ethylene acrylic acid copolymer (EAA) and ethylene vinyl alcohol copolymer (EVA). Polymer resins that have melt-flow indices in the range of 7 to 700 provide an effective matrix for the magnetic $2^{nd}$ phase. A higher melt flow index corresponds to a lower molecular weight and melt viscosity, which will allow greater magnetic orientation during deposition.

In one embodiment of the present invention, additional matrix material particles, which are free of magnetic particles, can be added to the composite particles obtained from the mechanofusion process. This is typically done when the composite particles fail to act as a flowable powder mixture as a result of magnetic agglomeration. Typically, the composite particles are mixed with additional matrix material particles at a ratio of 1:4 to 10:1, preferably 2:3 to 9:1, respectively by volume. The additional matrix material is the same as that described above for the matrix material.

The total volume percentages of the magnetic particles and the matrix material in the composite mixture, e.g., the composite particles and the matrix material particles, are chosen so that the composite mixture is a flowable powder mixture that can be pumped continuously through the feeder and the spray nozzle. As a result, the practical upper limit for magnetic particulate percentage by volume is the volume percentage at which the composite particles magnetically agglomerate, thereby preventing continuous flow through the feeder and the spray nozzle. Although the practical limit for magnetic particulate volume percentage differs for specific magnetic particles and specific matrix materials, the upper limit for a composite particle comprising strontium ferrite ($SrFe_{12}O_{19}$) and polyethylene methacrylic acid copolymer has been found to be about 20% by volume of strontium ferrite.

Figure 5:
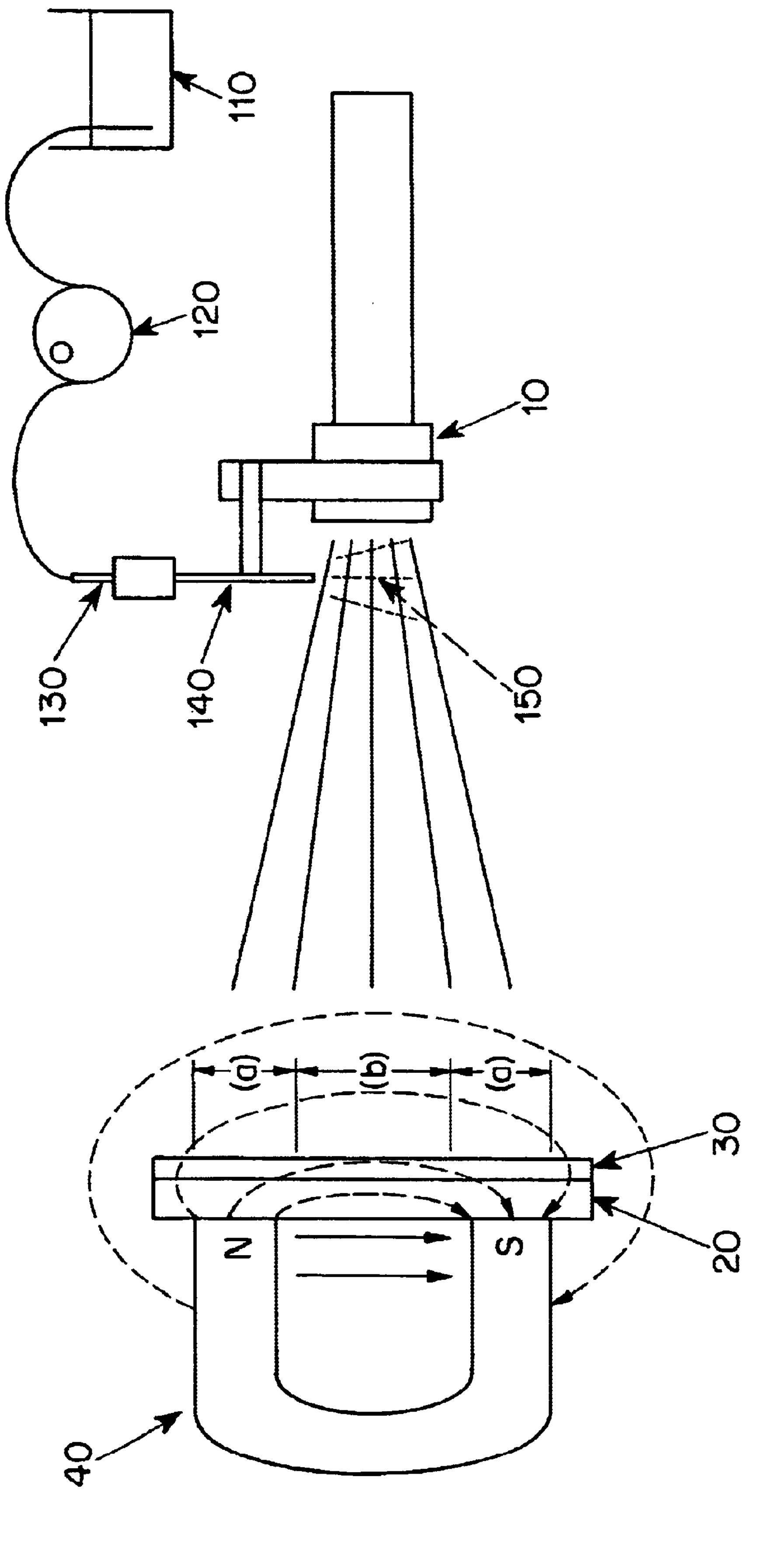
FIG. 5 illustrates a thermal spray arrangement according to the present invention which also includes a Suspension Atomizing System.
Figure 6:
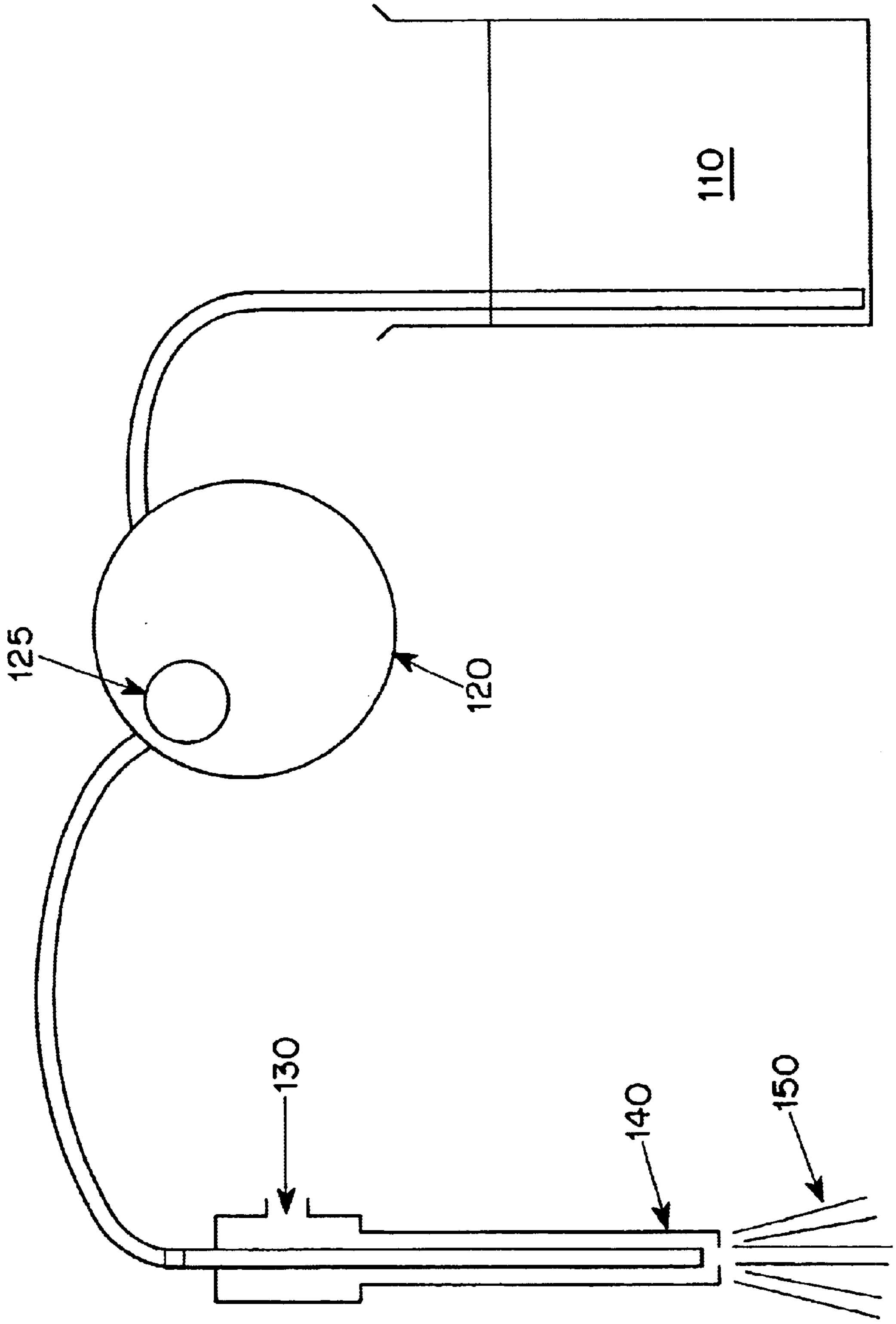
FIG. 6 illustrates a Suspension Atomizing System.
Figure 7:
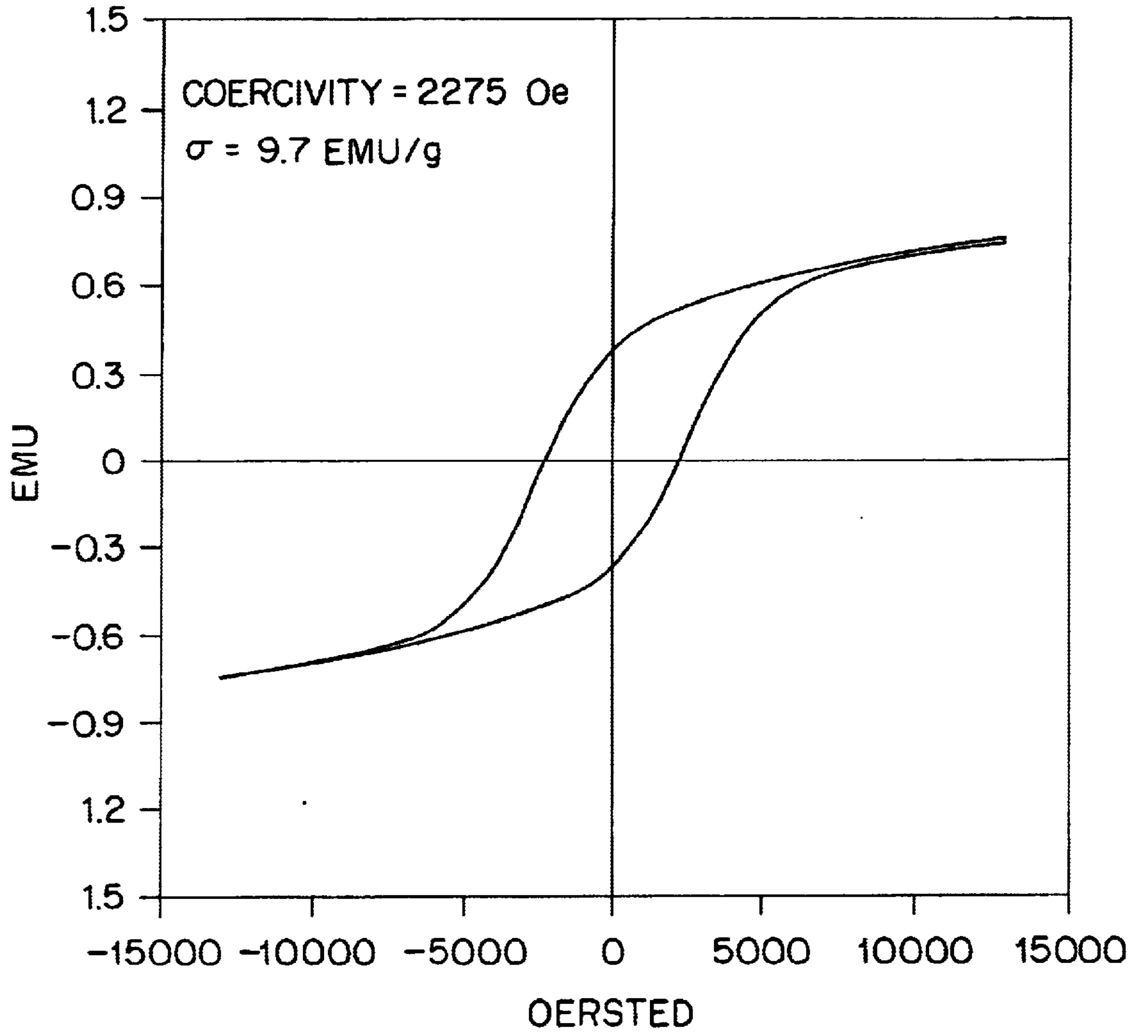
FIG. 7 illustrates a hysteresis loop for a flexible magnet according to the present invention having 12% by volume of strontium ferrite in a polyethylene-methacrylic acid co-polymer matrix according to the present invention.

In another embodiment of the present invention, the thermal spray step includes a second spray stream 150 which is introduced by a Suspension Atomizing System (SAS), as described in FIGS. 5 and 6. This second spray stream 150 provides a method of increasing the volume percentage of the magnetic particles without contributing to the agglomeration problem associated with the first spray stream from the thermal spray gun. The SAS system includes a stirred reservoir 110 containing a magneto-fluid mixture. The reservoir is fluidly connected to a controllable pump 120, which is typically a peristaltic pump. The outlet of the pump is fluidly connected to an atomizing probe 140, which combines the pumped fluid with an atomizing gas 130. The outlet of the atomizing probe is situated near the outlet of the thermal spray gun. Preferably, the parts of the Suspension Atomizing System that physically contact the second fluid stream are made of nonmagnetic materials. The flow rate of the second spray stream is also preferably chosen so that (i) the direction of the spray stream from the thermal spray gun is negligibly affected (i.e., the direction of the combined spray stream does not deviate more than 20 degrees from the original direction of the first spray stream) and (ii) a predominant portion of the magnetic particles, i.e., at least 51%, in the resulting coating or free-standing magnet is maintained in a single domain state. Typically, the direction of the second spray outlet is set at a 45° angle toward the direction of the thermal spray gun outlet.

The stirred reservoir 110 contains a magneto-fluid mixture of a vaporizable fluid, magnetic particles, and a dispersing agent. Such magneto-fluid mixtures are well known in the art, since they prevent agglomeration of the magnetic particles by effectively dispersing the magnetic particles throughout the vaporizable fluid, as described in G. Schiller et al., "Suspension Plasma Spraying of Cobalt Spinel," Proceedings of the United Thermal Spray Conference, p. 343 (September 1997), which is incorporated herein by reference. The magneto-fluid mixture comprises from about 39.9% to about 60%, preferably from about 50% to about 60%, by weight of a vaporizable fluid; from about 39.9% to about 60%, preferably from about 40% to about 50%, by weight of magnetic particles; and from about 0.1% to about 0.5%, preferably from about 0.2% to about 0.3%, by weight of a dispersing agent. The preferred mixing ratio of the magneto-fluid mixture is 1:1:0.4 of vaporizable fluid:magnetic particles:dispersing agent, respectively by weight.

The magnetic particles are the same as described above. The vaporizable fluid can be any fluid which (i) provides a uniform dispersion of the magnetic particles, (ii) converts to a gaseous state at the operating temperatures of the thermal spray gun, and (iii) vaporizes at an operating temperature below the Curie Temperature of the magnetic particles. Typically, the vaporizable fluid is a polar solvent. Vaporizing fluids which can be used according to the present invention include, but are not limited to, water, ethanol, methanol, and mixtures thereof. The dispersing agent typically has surfactant-like properties which help to uniformly disperse the magnetic particles. Dispersing agents which can be used according to the present invention include, but are not limited to, sodium polymethacrylate (30% solution in water), which is sold under the trade name of Darvan No. 7 by R.T. Vanderbilt Company, Inc.

The methods according to the present invention produce (i) flexible, anisotropic, magnetic coatings on substrates and (ii) flexible, free standing, anisotropic magnets which may have complex three-dimensional shapes. These magnetic coatings and free standing magnets have from about 8% to about 38% by volume of magnetic particles. More importantly, the magnetic particles are oriented in a desired direction so that at least one section of the magnetic coating or free standing magnet has an easy magnetic axis. Furthermore, these magnetic coatings and free standing magnets have a coercivity that is greater than about 2200 Oe.

EXAMPLES

The following examples further describe illustrative embodiments of the present invention.

Example 1

Flexible, Anisotropic Magnet Prepared by Thermal Spray

A flexible, anisotropic magnet having dispersed strontium ferrite (SF) particles ($SrFe_{12}O_{19}$; Curie temperature=450° C.) in a polyethylene methacrylic acid copolymer matrix material (EMAA; melting point=95° C.) was made according to the following process. EMAA particles having an average particle size of 80 microns was obtained from Plastic Flamecoat System located in Big Spring, Tex., and SF particles with an average particle size of 2 microns was obtained from Stackpole, Inc., located in Kane, Pa. 100 grams of the SF powder was added to 74.8 grams of the EMAA in a mechanofusion milling system (model Angmil AF-15, manufactured by Hosakawa located in Summit, N.J.) for 30 minutes at 550 rpm and then another 30 minutes at 700 rpm. After each 30 minute interval, the mechanofused composite particles were observed under an optical microscope to verify incorporation of the magnetic particles. Assuming a density of 5.1 gm/cm$^3$ for SF, and 0.93 gm/cm$^3$ for the EMAA, the corresponding volume percentages for the first sample were approximately 20% by volume of SF and 80% by volume of EMAA. The density of the 20% by volume SF mechanofused composite particles was 1.748 gm/cm$^3$, which was calculated as follows:

$$(100\text{ gm } SF)/(5.1\text{ gm/cm}^3)+(74.8\text{ gm } EMAA)/(0.93\text{ gm/cm}^3)=100\text{ cm}^3\text{ total volume,}$$

$$(100\text{ gm } SF+74.8\text{ gm } EMAA)/(100\text{ cm}^3)=1.748\text{ gm/cm}^3.$$

The procedure above was repeated two more times. However, the mechanofused composite particles were tumble mixed in a plastic container with additional EMAA particles (free of SF). A 12% by volume SF sample, the second sample, was made by adding 67 cm$^3$ (62.3 gm) of EMAA to 100 cm$^3$ (174.8 gm) of the 20% by volume SF mechanofused sample. An 8% by volume SF sample, the third sample, was made by adding 150 cm$^3$ (139.5 gm) of EMAA to 100 cm$^3$ (174.8 gm) of the 20% by volume SF mechanofused sample.

The three samples were individually sprayed onto a Teflon coated pan using a thermal spray apparatus PFS 200, manufactured by Plastic Flamecoat Systems, located in Big Spring, Tex. The outlet of the spray nozzle was placed 50 inches away from the Teflon coated pan. A permanent magnet providing a 11000 Oe magnetic field at the pole piece was placed behind the Teflon coated pan during the thermal spray step. After cooling, the magnetic samples were removed from the Teflon coated pan.

Measurements of the magnetic samples were obtained with a Vibrating Sample Magnetometer (VSM), model #1660 manufactured by Digital Measurement Systems, Burlington, Mass. The VSM is a highly sensitive instrument that is commonly use to accurately measure the magnetic properties of a material. Before measuring the samples, the VSM was calibrated with a 36.9 mg Ni standard sample having a saturation magnetization of 2.174 emu. An electromagnet applied a uniform DC (direct current) field of up to 13 kOe to the sample. The resulting magnetization induced in the sample was then measured by vibrating the sample to produce a voltage in a pair of pickup coils. The coil output voltage was combined with the output from the displacement transducer to produce a magnetization signal. The amplitude and frequency of the vibrations were than canceled out in a signal processor. At a fixed magnetic field strength applied by the electromagnet, the sample was measured N times (an arbitrary number of data points), and the N values of emu were averaged. The process was repeated at a new field strength until a complete hysteresis loop is produced.

Figure 8:
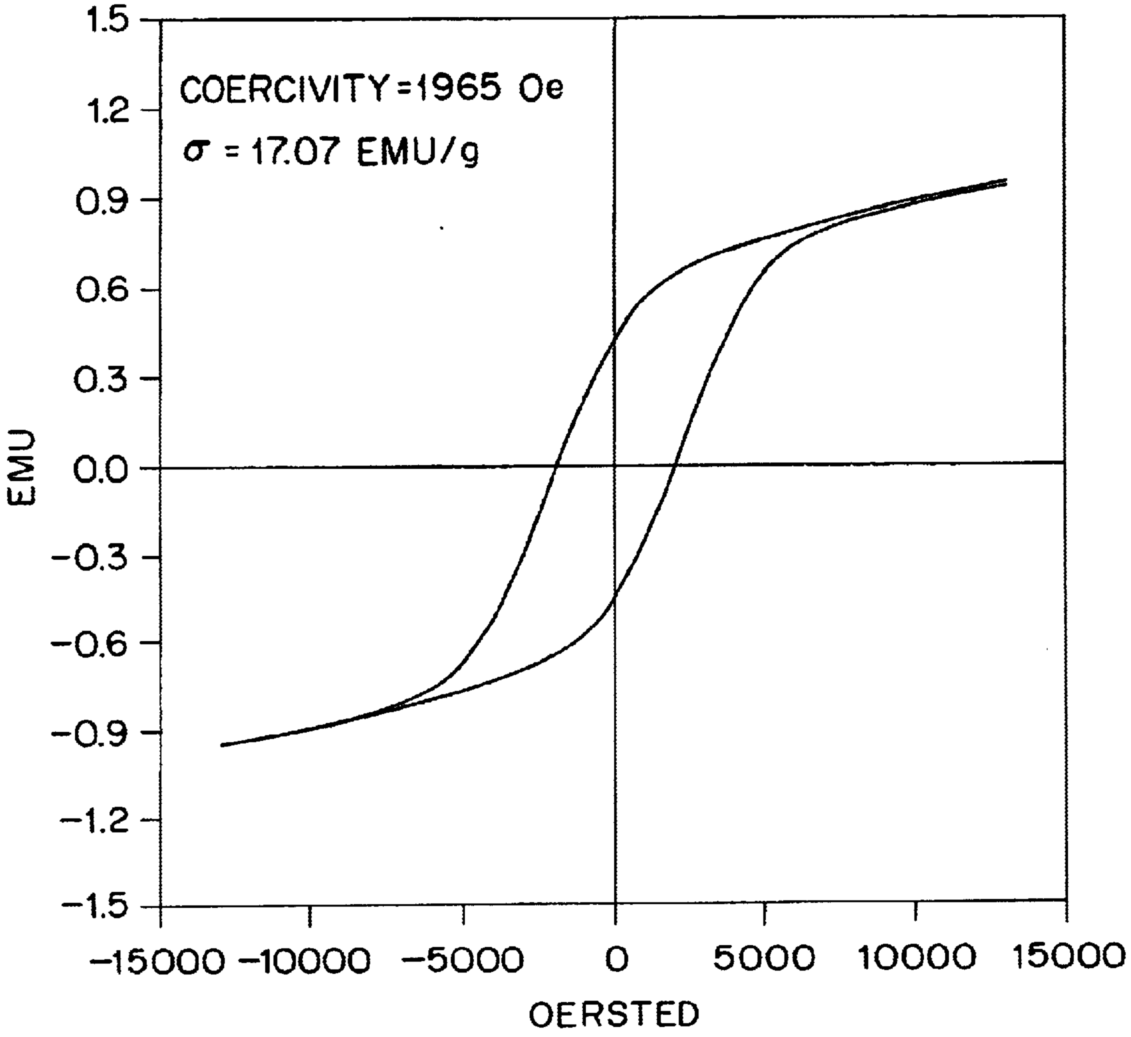
FIG. 8 illustrates a hysteresis loop for a flexible magnet according to the present invention having 20% by volume of strontium ferrite in a polyethylene-methacrylic acid co-polymer matrix.
Figure 9:
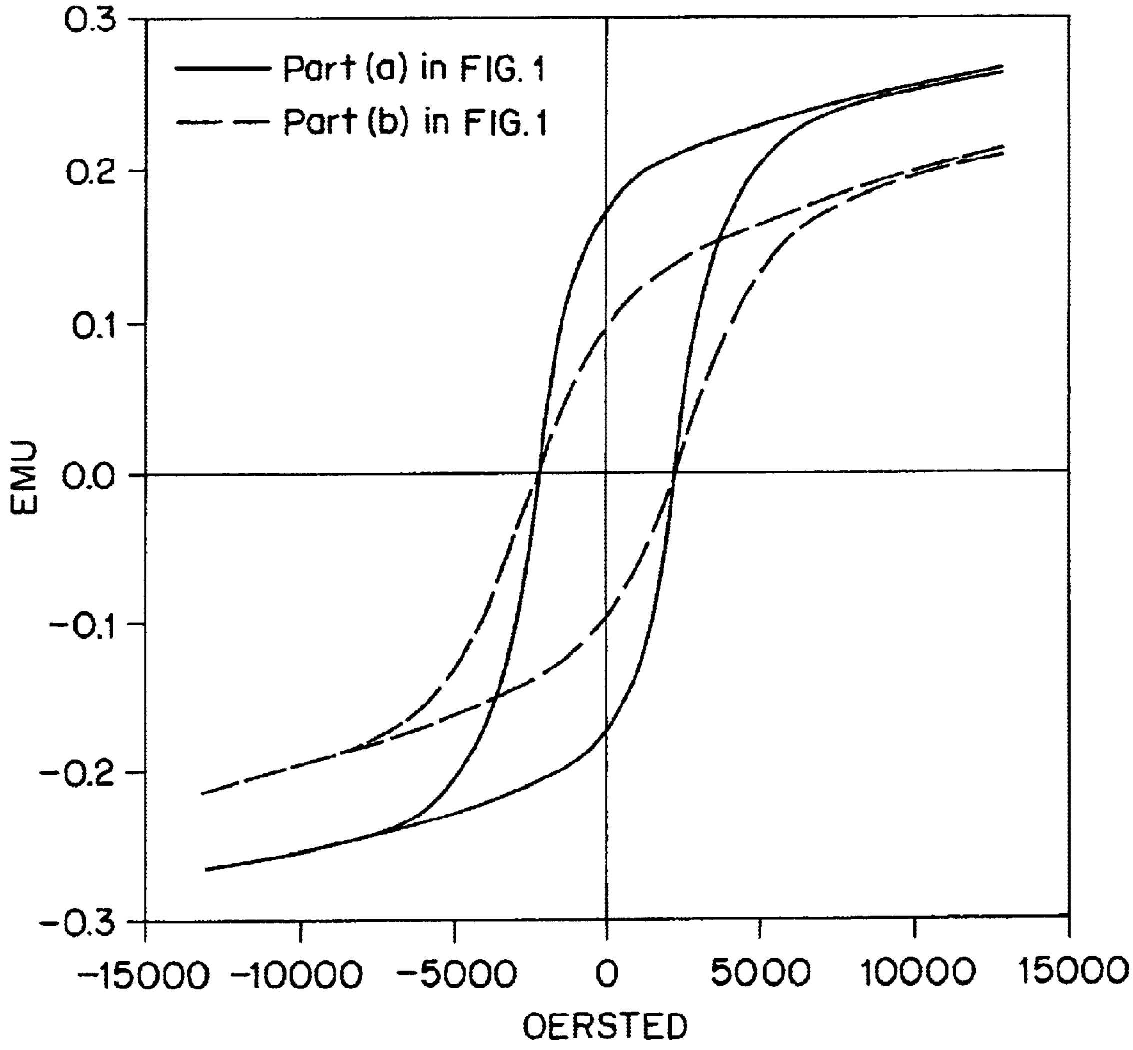
FIG. 9 illustrates a comparison between the hysteresis loops for a flexible magnet formed in a parallel applied field and in a perpendicular applied field, respectively, according to the present invention, the flexible magnet having 8% by volume of strontium ferrite in a polyethylene-methacrylic acid co-polymer matrix.

The magnetic sample was positioned in the VSM with the applied field aligned in the same direction with respect to the sample as the component of the applied magnetic field parallel to the substrate during the thermal spray step. The magnetic samples showed a maximum coercivity of 2275 Oe and saturation magnetization of 9.708 emu/g in the composition having 12% by volume of SF, and maximum coercivity of 1965 Oe and saturation magnetization of 17.01 emu/g in the composition having 20% by volume of SF in the EMAA matrix, as illustrated by FIGS. 8 and 9, respectively.

Figure 10:
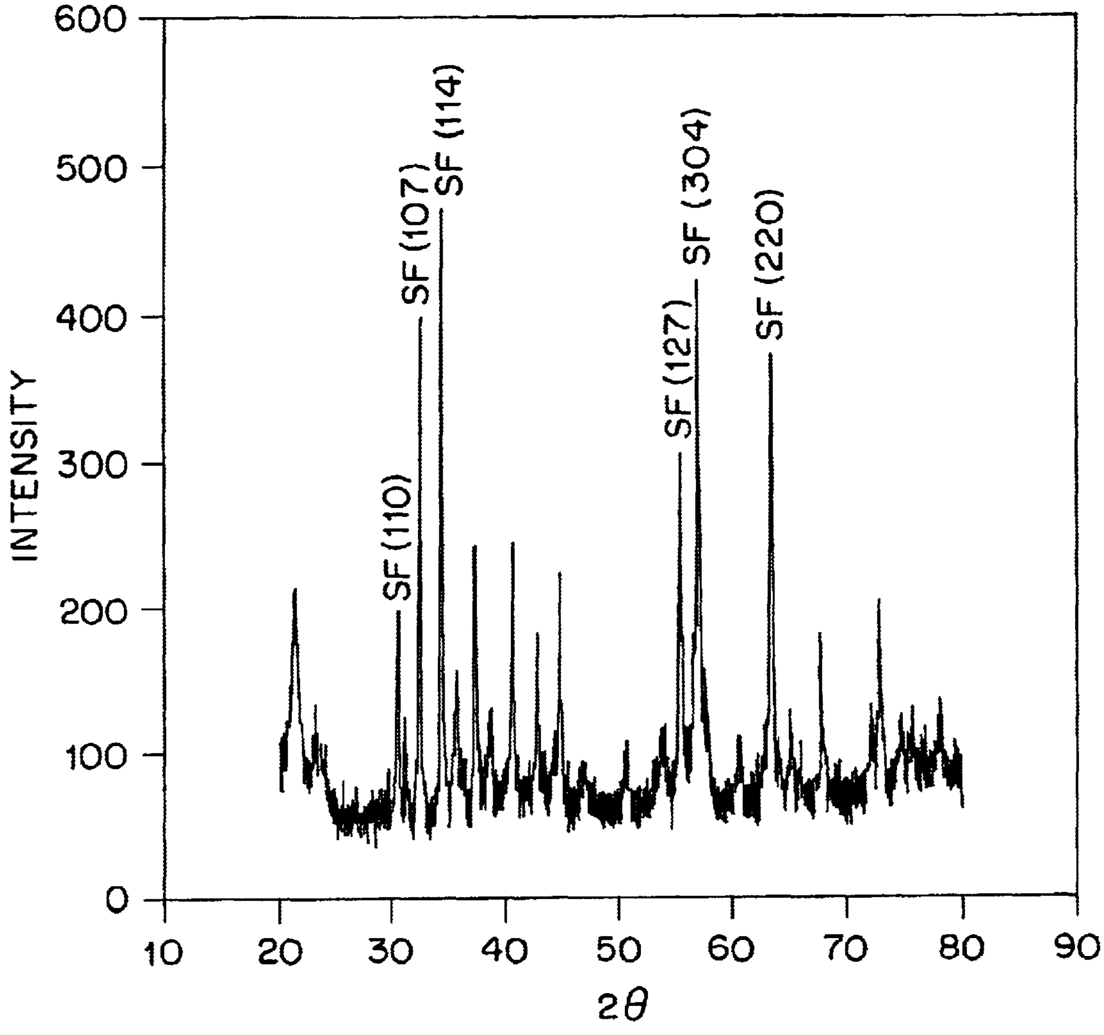
FIG. 10 shows the X-ray diffraction pattern for Part a of FIG. 1 for a flexible magnet according to the present invention having 8% by volume of strontium ferrite in a polyethylene-methacrylic acid co-polymer matrix.
Figure 11:
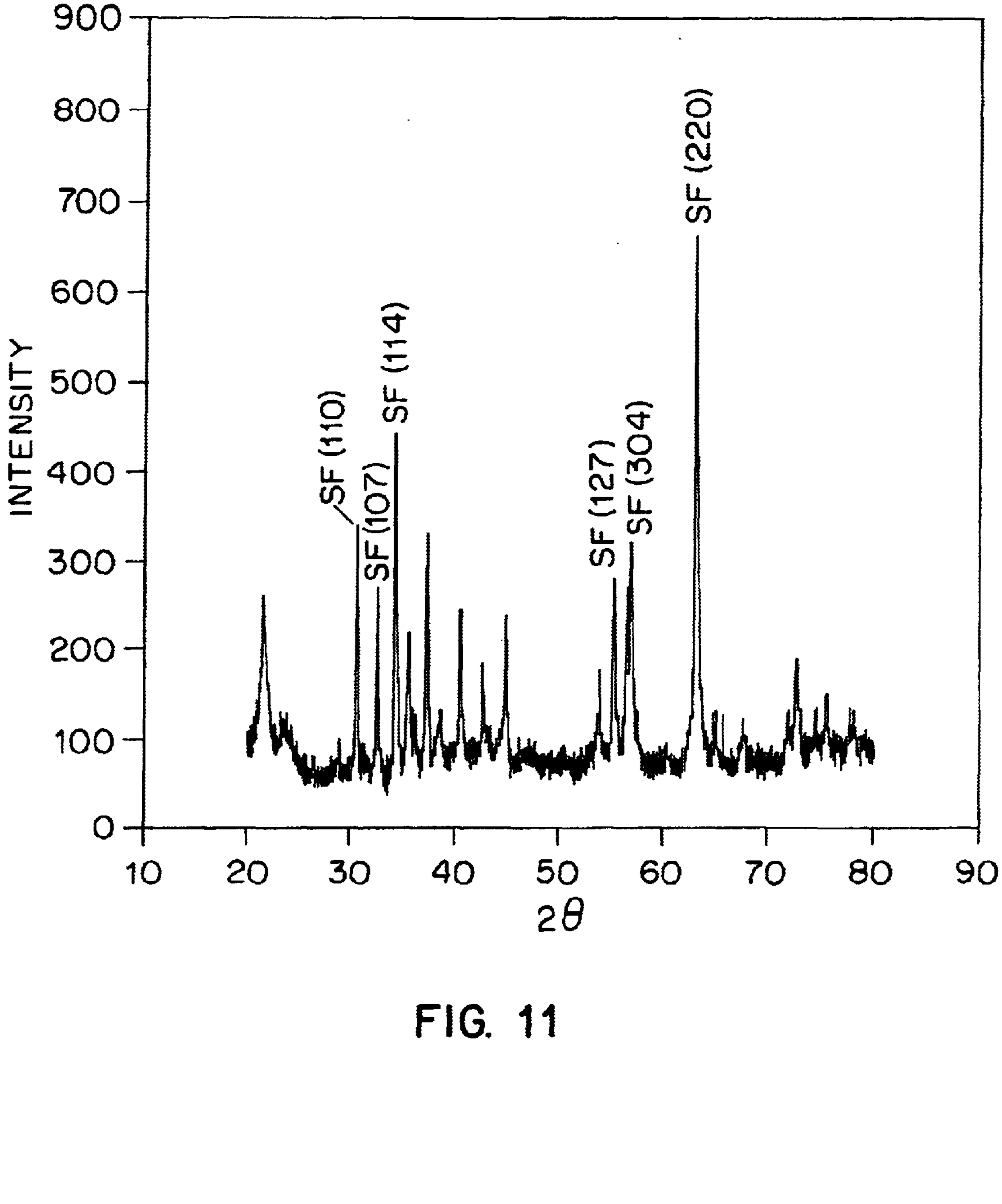
FIG. 11 shows the X-ray diffraction pattern for Part b of FIG. 1 for a flexible magnet according to the present invention having 8% by volume of strontium ferrite in a polyethylene-methacrylic acid co-polymer matrix.

The magnetic samples exhibited induced magnetocrystalline anisotropy; that is, the material had a certain easy magnetic axis resulting from the magnetic field applied to the substrate during thermal spraying. As illustrated in FIG. 9, magnetic data obtained from VSM measurements for the magnetic sample having 8% by volume SF at part (a) of FIG. 1 (the area of the magnetic sample where the field of the VSM was perpendicular to the substrate surface) and at part (b) of FIG. 1 (the area of the magnetic sample where the field of the VSM was parallel to the substrate surface) showed different magnetic properties. If the magnetic field of the VSM is applied parallel to the direction of the applied magnetic field during spraying, the hysteresis loop shows that the magnetic sample is easier to magnetize, as illustrated by hysteresis curve 9(*a*). If the field is applied in another direction, the hysteresis loop shows the sample is harder to magnetize, as illustrated by hysteresis curve 9(*b*). "In another direction" means in a direction other than the direction of parallel and perpendicular components of magnetic field applied by the permanent magnet during spraying. This test showed that the SF particles are aligned along the applied field direction during the spray process. The VSM data was supported by X-Ray Diffraction (XRD) data, which showed that the magnetic crystals of SF were aligned with their easy magnetic axis, the c-axis, along the applied field direction during thermal spraying, as illustrated by FIG. 10 (X-ray diffraction pattern for Part (*a*) of FIG. 1 for a coating having 8% by volume of SF) and FIG. 11 (X-ray diffraction pattern for Part (*b*) of FIG. 1 for a coating having 8% by volume of SF). The peaks represent atomic planes of hexagonal structure of the strontium ferrite particles.

Example 2

Flexible Magnets Prepared by Thermal Spray in Combination With a Suspension Atomizing System When using the thermal spray system alone, the maximum volume percentage of SF loaded into the EMAA matrix was 20% due to magnetic agglomeration of the feed stock in the feeding mechanism resulting from the attractive forces of the magnetic particles in the composite particles. The problem of feed stock agglomeration can be solved by (i) using a feeding mechanism the prevents magnetic agglomeration, e.g., simultaneously providing physical agitation to overcome the attractive forces, or (ii) reformulating the feed to overcome the attractive forces, e.g., forming a dispersion having a dispersing aid. Since the present thermal spraying system was based on using air as the carrier fluid, a third alternative was used to increase the SF volume percentage above 20%. This third alternative was the introduction of a complementary SF source from the Suspension Atomizing System (SAS), as illustrated in FIGS. 5 and 6.

Referring to FIGS. 5 and 6, which illustrate the secondary spray system, the SAS includes a peristaltic pump 120 (model no. 7553–80, manufactured by Cole-Palmer, Inc., located in Vernon Hills, Ill.), a head 125 (model no. 7014–20, manufactured by Cole-Palmer, Inc., located in Vernon Hills Ill.), and an atomizing probe 140, manufactured by TEKNA, Inc., located in Sherbrooke, Quebec, Canada). The suspension was prepared by the mixing ratio of 1:1:0.4 by weight of $H_2O$:SF powder:dispersing agent, respectively. SF particles having an average particle size of 2 microns was obtained from Stackpole, Inc., located in Kane, Pa. The dispersing agent was Darvan No. 7, manufactured by R.T. Vanderbilt Company, located in Buena Park, Calif. This particular dispersing agent has been used as a deflocculant for agglomerated SF particles in liquid suspensions. The SAS was used at a maximum feeding rate of 36.2 g/min., which corresponds to a feed rate of 15.51 g/min SF particles for a magneto-fluid mixture, which was made by mixing together 400 gm of water, 310.2 gm of SF and 14 gm. of DARVAN No. 7.

Figure 12:
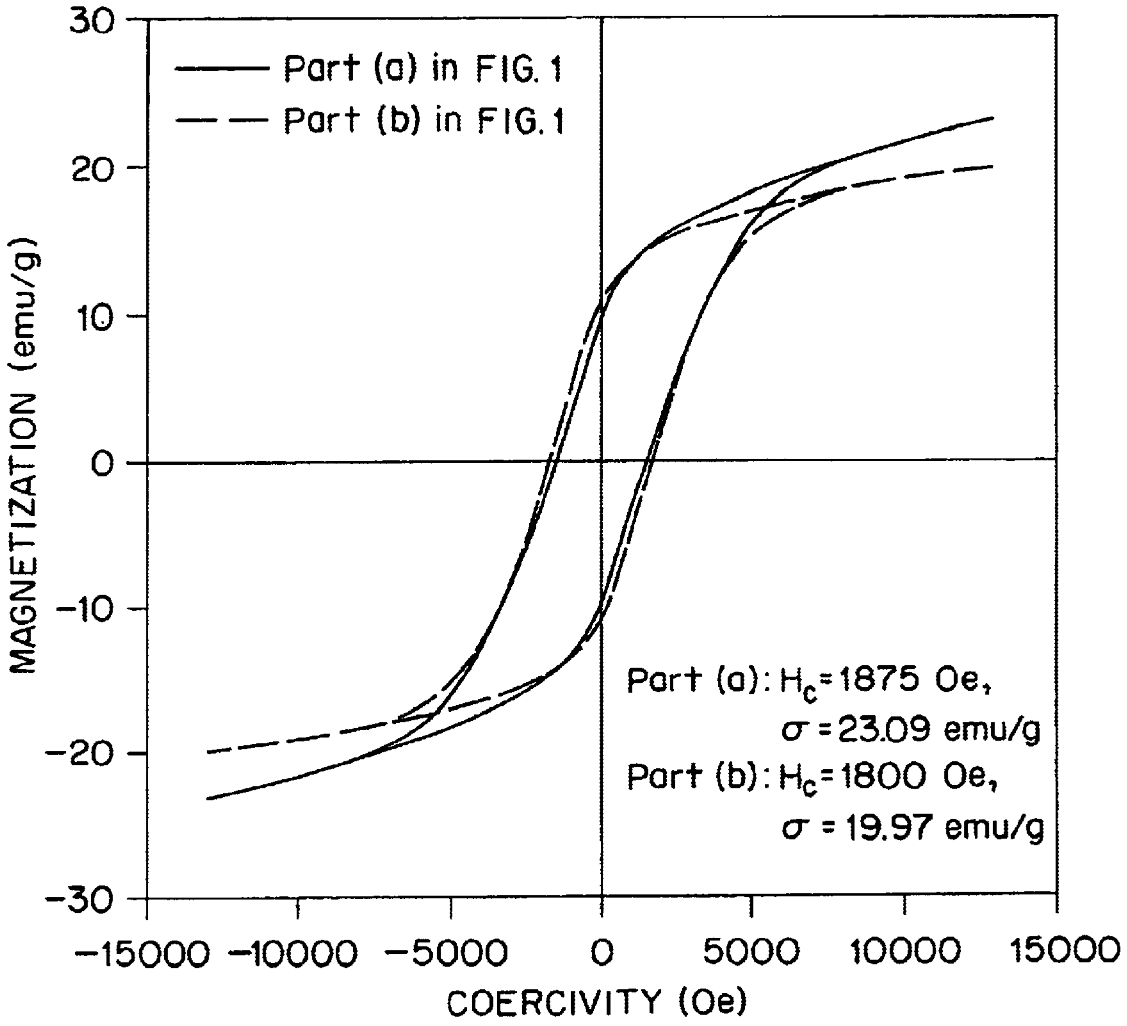
FIG. 12 illustrates hysteresis loops for a flexible magnet formed in a perpendicular magnetic field and in a parallel magnetic field, respectively, according to the present invention, the flexible magnet having 38% by volume of strontium ferrite in a polyethylene-methacrylic acid co-polymer matrix.

Running the SAS system in combination with the thermal spray system described in Example 1 (in the manner shown in FIG. 5) with a Teflon coated pan as the substrate, a magnetic sample was obtained having an SF loading of up to 38% by volume. The VSM measurements for the magnetic sample with the 38% by volume of SF showed the hysteresis curve illustrated in FIG. 12. The coercivity was 1875 Oe and the sigma value was 23.09 emu/g for part (*a*) in FIG. 1, and the coercivity was 1800 Oe and the sigma value was 19.97 emu/g for part (*b*) in FIG. 1. The squareness (Ir/Is) of the SAS sample was 0.526.

The volume percent of the magnetic particles in the resulting flexible anisotropic magnets can be determined by any reliable method known to those skilled in the art. However, the density method and the gravimetric method are preferred. The density method includes measuring the weight and volume of the flexible magnet and comparing the resulting density with the known densities of the polymer, magnetic particles, and the composite particles. Volume is measured by immersing the flexible magnet in a graduated cylinder containing water. Since the secondary spray system provides 100% of the magnetic particles (e.g., the water and dispersing agent are vaporized), the volume percent of the magnetic particles in the flexible magnet can then be calculated.

The gravimetric method includes measuring the weight and volume of the flexible magnet. The flexible magnet is then heated in the presence of oxygen at a temperature high enough to oxidize all of the polymer, i.e., burn the polymer away, but not affect the magnetic particles. The weight and volume of the remaining magnetic particles are then obtained using the same methods discussed above. The resulting measurements can then be compared to the measurements of the flexible magnet to calculate the volume percent of the magnetic particles.

What is claimed is:

1. A method for producing a flexible anisotropic magnetic coating comprising the steps of: thermal spraying a first spray stream, comprising composite particles of magnetic particles and a matrix material, onto a substrate at a temperature that is above the glass transition or melting point temperature of the matrix material but below the Curie temperature of the magnetic particles; and applying a magnetic field to said substrate during the spraying step.

2. A method according to claim 1, wherein said magnetic particles have an $H_c$ of greater than about 150 Oe, and wherein said matrix material has a melt-flow index from about 7 to about 700.

3. A method according to claim 1, wherein said magnetic particles are selected from the group consisting of $Sm_2Fe_{17}C$, $Sm_2Fe_{17}N_{27}$, $Sm(CoFeCu)_7$, $Nd_2Co_{14}B$, $Nd_2Fe_{14}B$, $SrFe_{12}O_{19}$, $BaFe_{12}O_{19}$, $CoFe_2O_4$, $SmCo_5$, $NdCo_5$, $CeCo_5$, CoPt, $Nd_2Fe_{14}B$, $Nd_2Fe_{14}C$, $Nd_2Fe_{14}N$, $Fe_3BiNd$, $SmFe_{11}Ti$, $SmFe_{10}V_2$, $SmFe_{10}Mo_2$, $Sm(Co_{0.68}Cu_{0.10}Fe_{0.21}Zr_{0.01})_{7.4}$, $Sm_2Co_{17}$ and mixtures thereof; and said matrix material is selected from the group consisting of ABS, EVA, PEKK, EMAA, PMMA, EAA, polypropylene, polyvinylchloride, polyvinylacetate, nylon, polyethylene, polycarbonate, polystyrene, polyester elastomer, methacryl resin, polyacetal, polyamide resin, thermoplastic polyurethane, JCI, polytherimide, imide based polymers, polyphenylene oxide, fluoroplastics, acrylontrile-styrene resin, ionomer resin, vinylchloride vinylacetate copolymer, polyethylene copolymer, polysulfone, polyether sulfone, polyarylsulfone, chlorosulfonated polyethylene, polyisobutylene, poly(etherketone), poly(etheretherketone), poly(phenylylene sulfide) and mixtures thereof.

4. A method according to claim 1, wherein said composite particles comprise particles of matrix material having magnetic particles incorporated therein or thereon.

5. A method according to claim 4, wherein the magnetic particles have an average particle size from about F microns to about 84 microns, and the particles of the matrix material have an average particle size from about 20 microns to about 330 microns.

6. A method according to claim 4, further comprising the step of forming the composite particles by incorporating the magnetic particles onto or into the matrix material particles.

7. A method according to claim 6, wherein said step of forming composite particles includes a mechanofusion step.

8. A method according to claim 1, wherein particles of a matrix material, which are free of magnetic particles, are further added to said first spray stream.

9. A method according to claim 1, further comprising the step of providing at least one additional spray stream comprising a magneto-fluid mixture, said at least one additional spray stream intersecting said first spray stream at a predetermined angle to combine with said first spray stream to coat the substrate.

10. A method according to claim 9, wherein said at least one additional spray stream is produced by a Suspension Atomizing System.

11. A method according to claim 9, wherein said magneto-fluid mixture comprises magnetic particles, a vaporizable fluid, and a dispersing agent.

12. A method according to claim 1, wherein said substrate is a removable mold.

* * * * *